Jan. 30, 1962 T. L. GAIL 3,018,907
TRAILER STRUCTURE
Filed Aug. 7, 1958 3 Sheets-Sheet 2
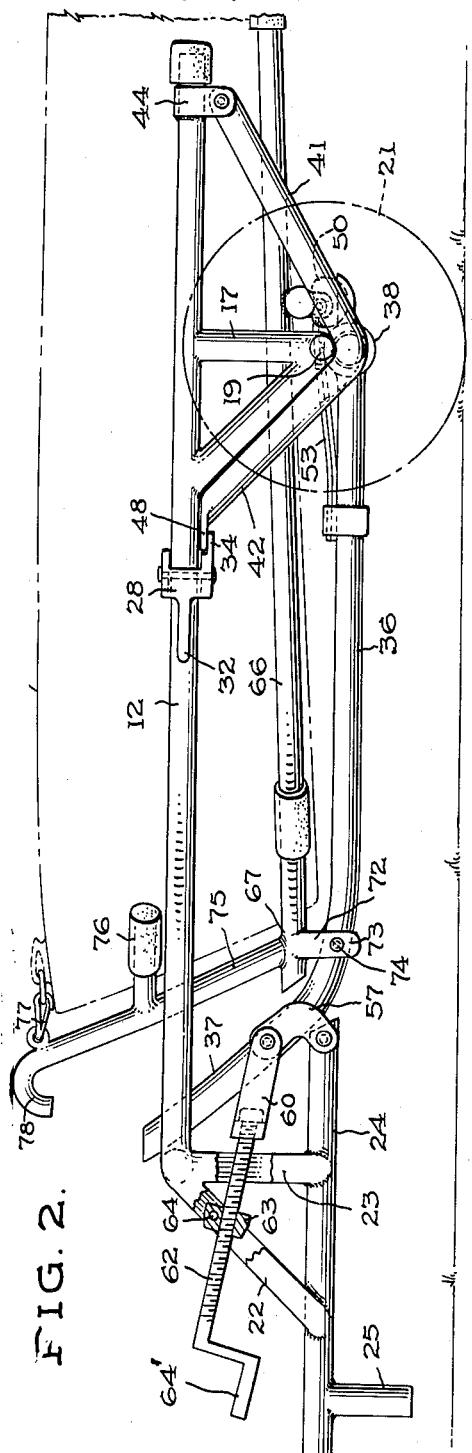
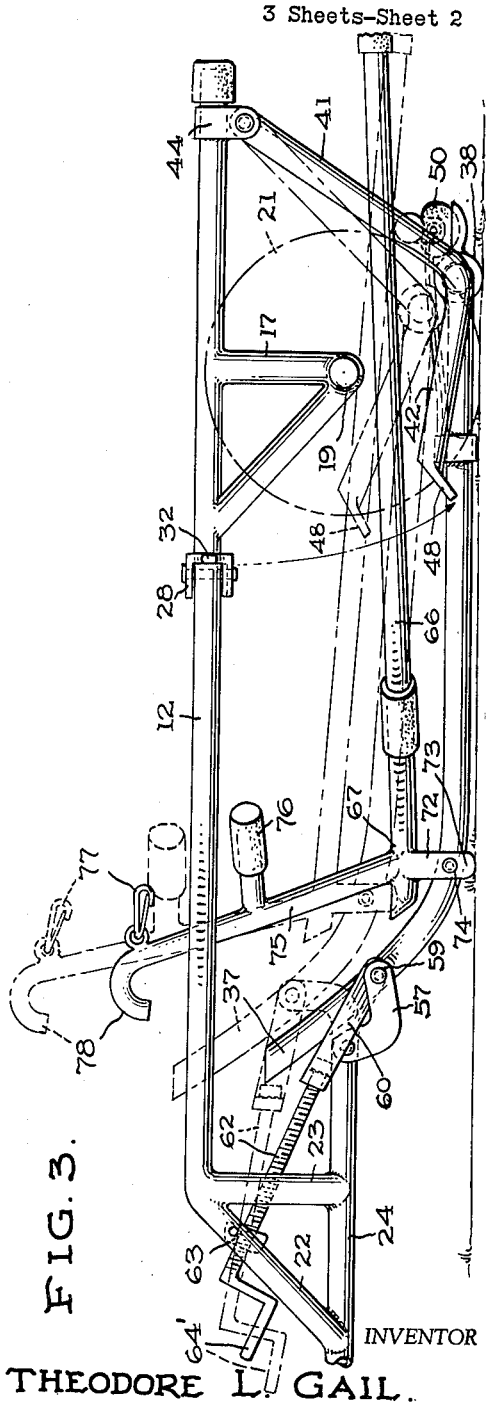
INVENTOR
THEODORE L. GAIL.
BY Cameron, Kerkam & Sutton
ATTORNEYS Jan. 30, 1962 T. L. GAIL 3,018,907
TRAILER STRUCTURE
Filed Aug. 7, 1958 3 Sheets-Sheet 3

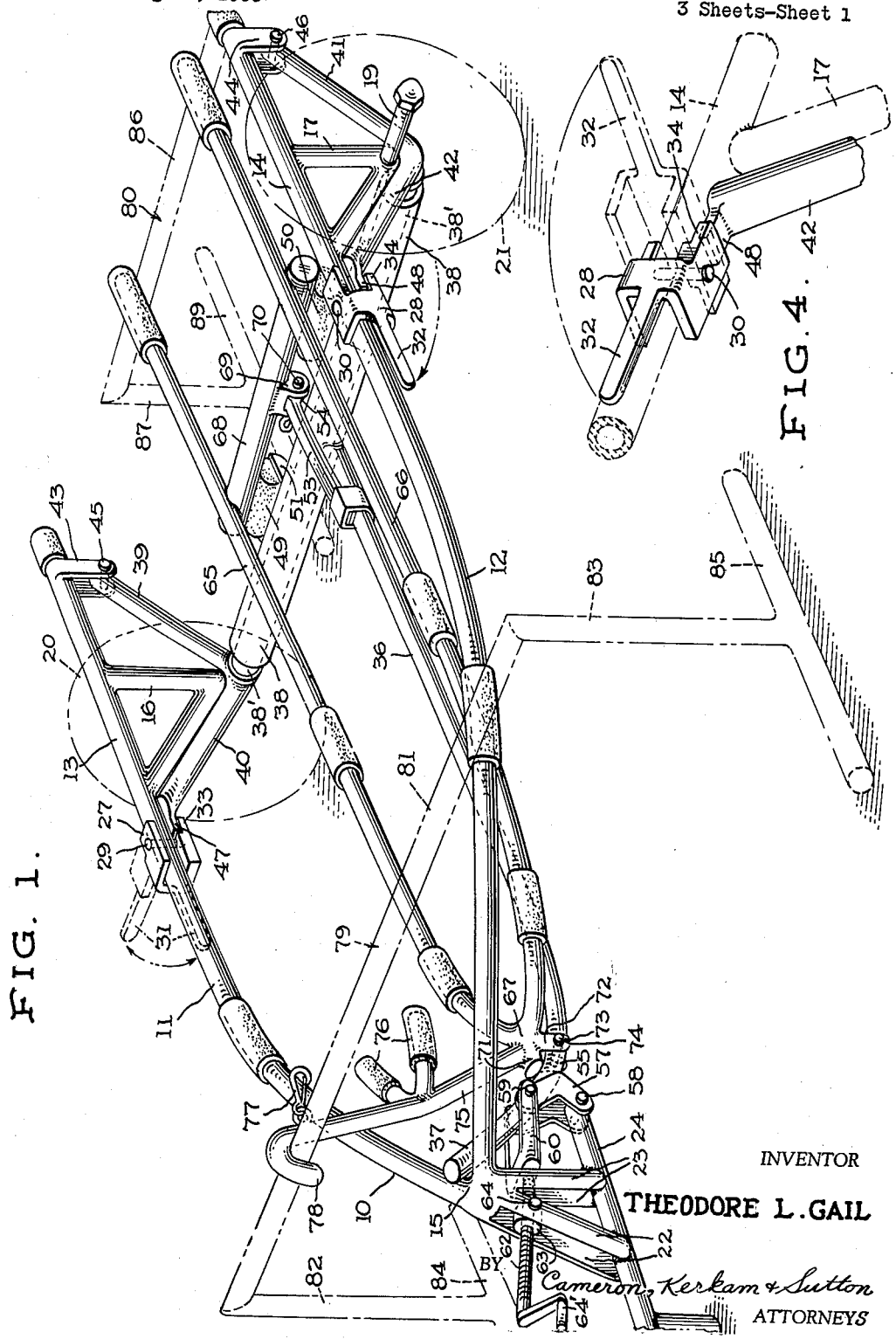

INVENTOR
THEODORE L. GAIL.
BY Cameron, Kerkam & Sutton
ATTORNEYS

United States Patent Office 3,018,907
Patented Jan. 30, 1962

3,018,907
TRAILER STRUCTURE
Theodore L. Gail, P.O. Box 194, Fairhope, Ala.
Filed Aug. 7, 1958, Ser. No. 753,766
5 Claims. (Cl. 214—506)

This invention relates to an improved trailer structure designed for the transportation of boats and other craft behind a vehicle which is of improved and convertible structure and in which the lowering and elevating of the boat in the trailer is facilitated by improved elevating structure therein.

The improved trailer is so designed that the boat may be loaded thereon with a minimum of effort due to the fact that the inner frame of the trailer may be lowered to ground level for the reception of the boat and may then be readily elevated to traveling height after the boat is in place therein.

The invention also contemplates the provision of improved supporting means affixed to the central beam of the inner frame in such fashion that it may readily be removed therefrom for the support of the boat outside of the trailer and to permit the use of the trailer for other transporting purposes.

The trailer is so designed that the main frame, the transporting wheels and forward tongue portion thereof are maintained in fixed position with respect to the surface of the ground, the only movable portion of the trailer structure being the pivotally mounted inner frame to which is removably affixed the auxiliary frame structure, as aforesaid.

The invention further contemplates improved means for raising and lowering the inner frame structure and the provision of improved airspring or resilient means between the inner frame and the removable support frame, as will hereinafter be discussed more fully.

It is therefore a primary object of this invention to evolve an improved trailer structure designed primarily for the transport of small craft which will greatly facilitate the loading and unloading of said craft.

It is another object of this invention to evolve improved inner frame structure and mounting therefor in a trailer.

It is a further object of this invention to provide an improved supporting frame removably affixed to the inner frame of the trailer.

It is another object to provide improved shock absorbing means for the supporting frame.

Other and further objects of this invention will become apparent as this specification proceeds.

Referring to the drawings,

FIG. 1 is a perspective view of the trailer structure in elevated or transporting position, with the end racks and wheels shown in phantom;

FIG. 2 is a side view, partially broken away and in phantom, of the trailer structure in elevated position for transportation of a craft;

FIG. 3 is a side view of the trailer, partially in phantom, showing stages of the lowering operation;

FIG. 4 is a detail view of one of the latches of the main frame;

Figure 5:
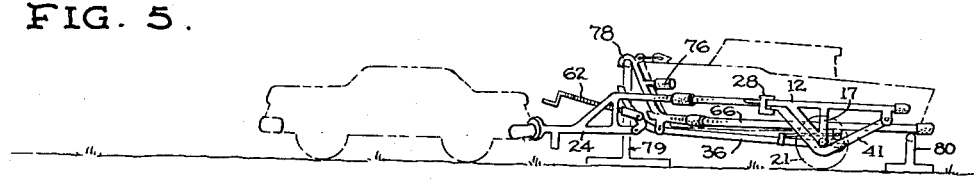
FIG. 5 is a side view of the trailer and tractor with the racks in place at both ends of the auxiliary frame.

In the drawings, the main frame 10 of the trailer structure is shown comprising paired tubular rails 11 and 12 which are spaced apart to a distance exceeding the width of a craft to be transported at their parallel rear extremities 13 and 14 and are brought forwardly in a smooth curve and joined at their forward extremities at 15. Rails 11 and 12 are substantially parallel throughout their rear portions 13 and 14 and are then gradually curved inwardly adjacent their medial portions to meet at forward point 15. Angular wheel supporting brackets 16 and 17 are shown affixed beneath and depending downwardly from rear extremities 13 and 14 of main frame 10 in vertical position with respect thereto and are provided at their lower, outer extremities with rectangularly disposed stub axles 18 and 19 upon which are rotatably mounted transport wheels 20 and 21. Wheels 20 and 21 may be of any desired diameter and are preferably provided with inflatable rubber tires to facilitate movement of the trailer upon the ground surface.

Depending downwardly from forward extremity 15 of main frame 10 are paired angular arms 22 and 23 between the lower extremities of which is appropriately welded or otherwise affixed a tongue member 24, provided at its lower forward extremity with a vertically disposed support member 25 designed to maintain the trailer frame in horizontal position when not in transit. At the forward extremity of tongue 24 a pintle 26 is provided for the attachment of the trailer frame to a vehicle for transport.

Affixed over rear extremities 13 and 14 of rails 11 and 12 forwardly of wheel brackets 16 and 17 are open, rectangular latch members 27 and 28, which, as shown, are preferably pivotally affixed thereover by means of vertical pins 29 and 30 for angular lateral movement with respect thereto. At their forward outer extremities latches 27 and 28 are provided with forwardly extending grip members 31 and 32 which normally closely fit against the sides of rails 13 and 14 of the main frame and by means of which latches 27 and 28 may be pivotally moved through an angle of some 90°, for a purpose hereinafter to be discussed at greater length. At their lower, rear extremities latches 27 and 28 are provided with rearwardly extending shoulders 33 and 34, which upon inward movement of brackets 27 and 28 swing inwardly under the side rails of the trailer, for a purpose hereinafter to be more fully discussed.

The foregoing has been a detailed description of the main, fixed frame of the trailer. There follows a detailed description of the preferred embodiment of the inner frame of the trailer which may be raised or lowered within the fixed main frame 10. This inner frame of the trailer is pivotally mounted at its rear and forward extremities within main frame 10 of the trailer to facilitate loading and unloading.

The inner frame comprises a central, longitudinal beam 36, which is preferably of tubular construction similar to that of main frame 10 and is preferably rectilinear throughout most of its length and is brought to a smooth upward curve at its forward extremity 37. Beam 36 extends longitudinally down the center of the trailer structure and lies in a plane beneath the plane of the main frame 10. As will be seen from FIG. 1, the curved forward extremity 37 of central beam 36 is designed to fit closely into the forward apex 15 of the main frame beams 11 and 12 when the inner frame is in fully elevated position. At its rear extremity central beam 36 is provided with a rectangularly disposed, cylindrical axle housing 38 which extends laterally therefrom the width of the trailer frame and lies beneath the lower extremities of angular wheel brackets 16 and 17 when the inner frame structure is in elevated position. A suitable axle 38' is closely and rotatably mounted within axle housing 38 and extends outwardly therefrom to the width of the trailer beneath wheel brackets 16 and 17. Mounted on the lateral extremities of axle 38', extending vertically therefrom and rotatable therewith are angular support arms 39—40 and 41—42 which are affixed thereto as by welding and which are preferably disposed at an obtuse angle with respect to each other. As shown, forward arms 40 and 42 are preferably of the same angularity as the forward segments of wheel brackets 16 and 17 so as to fit closely thereagainst when the inner frame is in elevated position.

Rear arms 39 and 41 are preferably bored at their upper extremities and fitted within depending, U-shaped brackets 43 and 44 affixed over the rear extremities 13 and 14 of beams 11 and 12 of the main frame. Bolts 45 and 46 are provided passing through the bored lower extremities of brackets 43 and 44 and the bored upper extremities of arms 39 and 41 to provide a pivotal mounting therefor in depending brackets 43 and 44. Forward arms 40 and 42 are preferably bent and flattened at their upper extremities to provide forwardly extending tongues 47 and 48, which are designed to fit over shoulders 33 and 34 of latches 27 and 28 when the inner frame is in elevated position and the latches are closed, as will be more fully discussed further on in this specification.

Airsprings or shock absorbers 49 and 50 are shown supported at the rear lateral extremities of axle housing 38, equally spaced on both sides of central beam 36 and supported on housing 38 by means of rearwardly extending supports 51 and 52 which are preferably cup-shaped and which maintain the upper surfaces of airsprings 49 and 50 an appreciable distance above the upper surface of axle housing 38.

Leaf spring 53 is shown affixed over the juncture of beam 36 and housing 38, as by welding or bolting, and is provided at its rear extremity with a vertically disposed eye 54 for a purpose hereinafter to be more fully discussed.

Central beam 36 is horizontally bored adjacent its forward extremity at 55 for a purpose to be more fully discussed.

The inner frame structure is pivotally and adjustably mounted at the rear extremity of tongue 24 of the main frame in the following fashion. A rearwardly curved toggle member of paired construction 57 is provided pivotally attached at its lower extremities over the rear end of tongue 24 and pivotally attached at its upper extremities over the lower segment of curved forward end 37 of central beam 36. Toggle 57 is preferably composed of two curved and parallel segments fitting over the lateral edges of the rear end of tongue 24 at its bottom and over the lateral surfaces of the forward curved extremity 37 of central beam 36 at its top. Toggle 57 is preferably affixed to the rear extremity of tongue 24 by means of a pin 58 and to curved extremity 37 of beam 36 by laterally disposed pin 59.

A U-shaped collar 60 is provided pivotally affixed over the upper extremity of toggle 57 about the forward curved extremity 37 of beam 36 by pin 59 and extends forwardly from curved extremity 37 of beam 36. At its closed end U-shaped collar 60 is preferably bored to receive the shouldered rear end 61 of a straight screw or jack member 62. Screw jack 62 is preferably supported between forward paired arms 22 of the main trailer frame by means of an internally screw threaded sleeve or nut member 63 which is pivotally mounted between the upper extremities of paired arms 22 by means of lateral pins 64 passing through the side walls of arms 22. Pivoted sleeve 63 is preferably centrally bored and screw threaded to conform to the diameter and threading of screw jack 62 in such fashion that screw jack 62 may be drawn or retracted therethrough upon turning of crank 64' disposed at its forward extremity.

Thus, it will be seen that a clockwise rotation of screw jack 62 in nut 63 by means of crank 64' will extend screw jack 62 rearwardly, forcing U-bracket 60 to the rear and forcing toggle 57 rearwardly and downwardly, resulting in a rearward and downward movement of the inner frame of the trailer by virtue of the pivotal mounting of the upper extremities of rear arms 39 and 41 in brackets 43 and 44 at the ends of beams 13 and 14 of the main frame. Conversely, counterclockwise rotation of crank 64' will move screw jack 62 forwardly through pivoted nut 63 and will pull bracket 60 and toggle 57 forwardly and upwardly to raise the inner frame until the forward tongues 47 and 48 of arms 40 and 42 bear against the lower surfaces of rails 13 and 14 adjacent clamps 27 and 28. With the tongues 47 and 48 in this position grips 31 and 32 of clamps 27 and 28 are swung inwardly against the lateral walls of rails 13 and 14 and shoulders 33 and 34 thereof pass under tongues 47 and 48 of arms 40 and 42 to secure the inner frame in elevated position. To lower the inner frame, arms 31 and 32 of clamps 27 and 28 are swung outwardly, freeing tongues 47 and 48 from shoulders 33 and 34 of the clamps and then upon clockwise motion of crank 64' screw 62 will move rearwardly, forcing bracket 60 and toggle 57 rearwardly and downwardly and lowering the inner frame structure, as desired, by virtue of the pivotal mounting of rear arms 39 and 41.

A third element of this combination will now be discussed. This element is the removable auxiliary or support frame for the boat which fits the keel thereof and which is removably mounted at its forward and rear extremities on central beam 36 of the inner frame. The removable auxiliary frame which fits over central beam 36 of the inner frame preferably comprises two substantially parallel tubular beam members 65 and 66 which are inwardly curved at their forward extremities and are brought together at forward point 67. A lateral beam 68 is provided beneath the rearward extremities of arms 65 and 66 appropriately welded or bolted or otherwise affixed thereunder to join their rearward extremities. Lateral beam 68 is preferably provided at its center with a downwardly depending bored, U-shaped bracket 69 designed to fit over eye 54 at the extremity of beam 36 and to be affixed thereto by means of a removable pin or bolt 70 which is passed through its bores and eye 54.

At its forward extremity 67 the auxiliary frame is provided with a forwardly extending tongue 71 lying in the same horizontal plane as arms 65 and 66 and beneath which is provided a U-shaped, downwardly depending bracket 72 fitting over beam 36 and bored at its lower extremities at 73 to register with forward bore 55 of beam 36. A pin 74 is provided, passing through bores 73 and bore 55 of beam 36 to removably mount the forward extremity of the auxiliary frame thereto.

Extending upwardly from forward tongue portion 71 of the auxiliary frame structure is a riser 75 which is preferably inclined forwardly with respect to the auxiliary frame at a slight angle to conform to the forward inclination of the bow structure of a supported craft. Affixed at the upper, rear extremity of riser 75 are rectangular support arms 76 designed to closely fit the forward bow portion of a transported craft. A hook or eye 77 is provided at the upper extremity of riser 75 and extends rearwardly therefrom for the attachment of a bow ring or other means provided at the bow of the transported craft to maintain it in position on the auxiliary frame.

The upper extremity of riser 75 is bent forwardly and curved downwardly at an angle of some 90° into hook 78 which is designed to be supported over a forward rectangular horse or stand 79 when the auxiliary frame is removed from the trailer structure. Similarly, a smaller rectangular horse or stand 80 is provided to fit under the rear extremities of arms 65 and 66 of the auxiliary frame when removed from the trailer structure, to maintain it in horizontal position and to support the craft thereon in such position.

As shown, rectangular support stand 79 preferably is of tubular construction and comprises a lateral beam 81, vertical arms 82 and 83 and rectangularly disposed foot members 84 and 85 disposed at right angles to main beam 81 to provide stability to the stand. Similarly, smaller rear stand 80 comprises a lateral beam member 86, rectangularly disposed arms 87 and 88 and foot members 89 and 90 disposed at right angles to beam 86, for stability.

Figure 6:
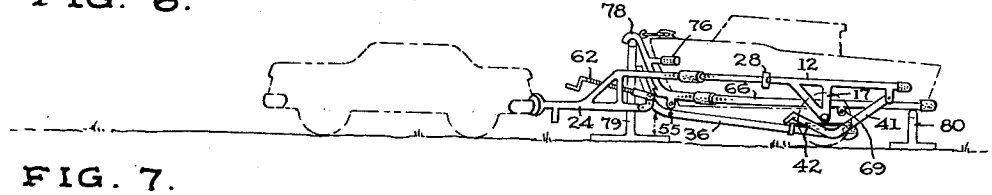
FIG. 6 is a side view of the trailer structure with the inner frame lowered and the auxiliary frame and boat supported on the racks.
Figure 7:
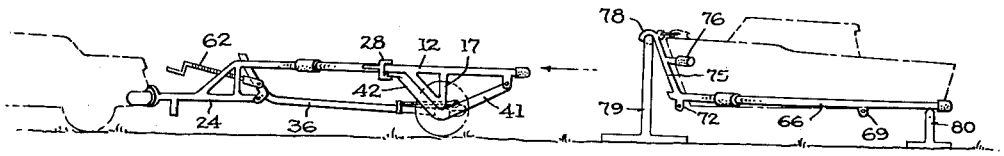
FIG. 7 is a side view of the auxiliary frame and boat supported on the racks, with the trailer structure withdrawn.
Figure 8:
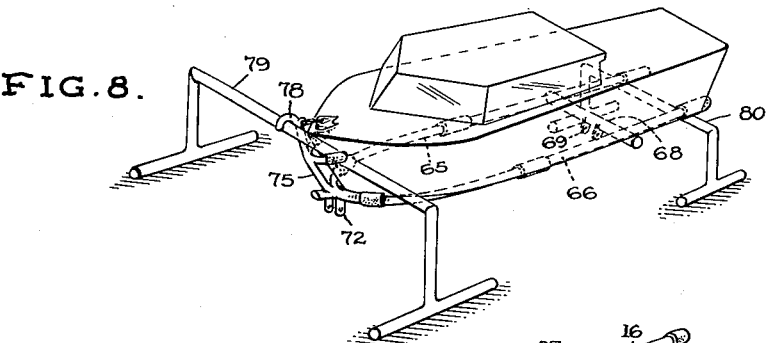
FIG. 8 is a perspective view of the auxiliary frame and boat supported on the end racks.
Figure 9:
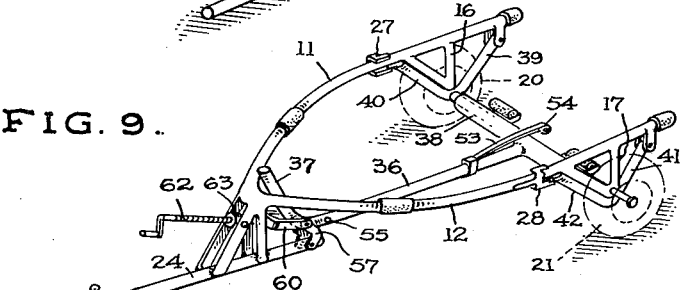
FIG. 9 is a perspective view of the trailer in elevated position with the auxiliary frame removed.
Figure 10:
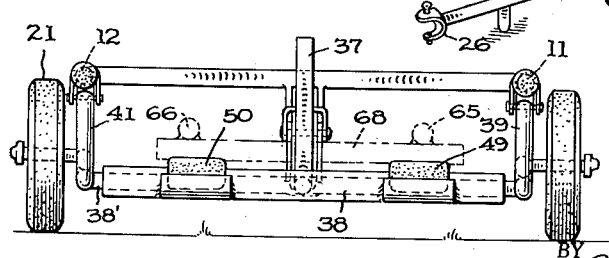
FIG. 10 is an end view of the trailer structure showing the airsprings of the inner frame supporting the cross bar of the auxiliary frame.

The manner of supporting the auxiliary frame on stands 79 and 80 is shown in FIGS. 5–8 of the drawings.

It will thus be seen that the trailer structure comprises three main component parts. The first is the main fixed frame structure comprising arms 11 and 12, tongue structure 24, and wheel brackets 16 and 17 provided with rotatable wheels 20 and 21. The second portion of the structure is the vertically adjustable inner frame comprising broadly main beam 36, axle housing 38, angular arms 39—40 and 41—42 affixed to the axle extremities, rear arms 39 and 41 being pivotally affixed at their upper extremities in brackets 43 and 44 depending from the rear extremities of main frame beams 11 and 12. Main beam 36 is pivotally affixed at its forward extremity to the rear extremity of tongue 24 of the main frame through toggle 57, collar 60 and screw jack 62 passing through pivoted nut 63 affixed between forward paired arms 22 of the main frame. Lastly, the third element of the combination is the auxiliary support frame which is removably affixed to central beam 36 at its rear extremity by means of depending bracket 69 and pin 70 passing through eye 54 and at its forward extremity by means of bracket 73 and pin 74 passing through bore 55 at the forward extremity of beam 36.

It will thus be seen that while the main frame 10 of the trailer structure, the transport wheels and the tongue 24 remain in fixed position the inner frame structure may be raised or lowered in the main frame, as desired, and the auxiliary frame affixed over the inner frame may be removed completely from the trailer structure for the support of the boat outside of the trailer on brackets 79 and 80, enabling the use of the trailer structure for other purposes. A number of auxiliary support stands may be provided with each trailer to permit the storage and transport of as many craft as desired.

The airsprings 49 and 50 provided on lateral axle housing 38 of the inner frame structure preferably extend above the upper surface of housing 38 and are positioned and designed to support the lateral extremities of cross beam 68 of the auxiliary support frame and act as cushions therefor during transport of a craft. As the auxiliary frame is mounted to beam 36 at its forward and rear extremities by pins passing through the depending brackets thereof and the bores 54 and 55 of beam 36 there is some play or movement in a vertical plane between the inner frame and the auxiliary support frame. This play is cushioned on the airsprings 49 and 50 to reduce jolting and to eliminate any possible road damage to the hull during transport. These air cushions may be of any desired type and are preferably composed of inflatable rubber bodies provided with suitable valves. The air pressure therein may be adjusted depending upon the weight of the craft being transported. Further, leaf spring 53 affixed over the rear extremity of beam 36 is connected by its eye 54 to the rear extremity of the auxiliary frame by pin 70 and thus provides a further resilient mounting therefor.

If desired, other types of springs may be substituted for airsprings 49 and 50, the important function of these springs being to cushion the rear extremity of the auxiliary frame during transport.

When it is desired to load a craft upon the trailer structure the following steps are taken. First, latches 27 and 28 are opened by pulling arms 31 and 32 thereof outwardly, thus freeing toes 47 and 48 of rear arms 40 and 42 therefrom. The crank 64' of screw jack 62 is then turned in a clockwise direction, extending the screw 62 rearwardly and forcing collar 60 and pivoted toggle 57 rearwardly and downwardly, the rear end of the inner frame pivoting in brackets 43 and 44 at the rear extremities of main arms 11 and 12. Clockwise turning of crank 64' is continued until the inner frame is completely lowered to ground level and the trailer frame is then in position for loading or unloading of a craft. If desired, the trailer may be backed into the water to such a depth that the boat may be substantially floated thereinto until the bow of the boat impinges against forks 76 of riser 75 of the auxiliary frame structure and the keel of the boat is supported between beams 65 and 66 thereof. The hook or attaching means 77 at the top of riser 75 is then affixed to the bow of the boat and the boat is in condition for elevation. Crank 64' is then turned in a counterclockwise direction, drawing screw jack 62 forwardly through pivoted nut 63 and pulling collar 60 and toggle 57 forwardly and upwardly. Simultaneously, the rear arms of the cross beam 38 of frame 36 are pulled forwardly and upwardly in brackets 43 and 44 until the upper surfaces of toes 47 and 48 of forward arms 40 and 42 impinge against the lower surfaces of frame arms 11 and 12 under clamps 27 and 28. Clamps 27 and 28 are then swung inwardly by levers 31 and 32 until shoulders 33 and 34 thereof register under toes 47 and 48 of the rear arms 40 and 42 and the entire assembly is then in locked position for transport of the craft. The forward extremity of tongue 24 is then raised, pulling forward support 25 thereof upwardly out of contact with the ground and the pintle 26 is applied over a mating hook on the vehicle and transport position of the trailer and craft is complete. The reverse of this operation is followed for unloading a boat from the trailer.

When it is desired to remove the auxiliary support frame from the trailer body the large support stand 79 is slid over the forward portion of the trailer structure until hook 78 of riser 75 of the auxiliary frame fits thereover. Simultaneously, the small horse or stand 80 is slid under the terminal extremities of arms 65 and 66 of the auxiliary support frame to provide rear support therefor. With the structure in this position pins 70 and 74 are withdrawn from the rear and forward extremities of the auxiliary frame, freeing it from central beam 36 of the inner frame. Crank 64' is then turned in a clockwise direction until the central beam 36 or the inner frame drops an appreciable distance below the auxiliary frame and the auxiliary frame is completely supported by its hook 78 on bracket 79 and at its rear extremities on bracket 80. With the inner frame in this lowered position the vehicle drawing the trailer is moved forwardly, thus pulling the balance of the trailer frame out through bracket 79 from under the auxiliary frame and craft supported thereby and freeing the trailer for other uses. To reload the auxiliary frame and craft upon the central beam 36 the reverse of this operation is followed, and with the replacement of pins 70 and 74 the auxiliary frame is again in position for transport.

This invention constitutes a distinct improvement over the conventional boat trailer and provides such a structure which has a fixed main frame and a vertically adjustable inner frame which greatly facilitates the loading and unloading of boats and provides highly improved transport facilities therefor. The support frame may be dropped to ground level with the greatest of ease and a boat may be readily loaded or unloaded with a minimum of effort. All manipulation of the vertically movable inner frame is conducted through the forward crank 64' and jack screw 62 and the mechanical advantage obtained through collar 60, link 57 and the pivotal supports of the rear arms 39 and 41 of the inner frame greatly reduces the effort necessary to elevate and lower the inner frame with the craft implaced thereon.

Equivalent mechanical elements may be substituted for the various elements of the combination without departing from the spirit of this invention. Thus, a cable and reel structure may be substituted for the jack screw and nut structure 62, 63 at the forward extremity of the main frame to raise and lower the inner frame structure of the trailer. Various types of alternative locking means for the forward extremities of arms 40 and 42 may be used, for example, slidable split rings may be provided over beam extremities 13 and 14 in place of these latches. Any other appropriate type of movable clamping means may also be substituted for the latch members.

While the airsprings 49 and 50 are preferably of the inflatable type, any other appropriate type of resilient supporting means, for example, coil springs or conventional hydraulic shock absorbers, may be substituted therefor.

The dimensions of the trailer may be varied at will to accommodate craft of varying sizes.

The invention is susceptible of numerous embodiments without departing from the spirit thereof. Attention is directed to the appended claims for a limitation of the scope of this invention.

What is claimed is:

1. In a trailer a main frame comprising two rails parallel at their rear extremities converging and joined at their forward extremities, arms depending from the forward point of juncture of said rails, a longitudinal tongue horizontally supported between the lower extremities of said arms lying in a plane beneath and parallel to the plane of said rails and extending forwardly and rearwardly beneath beneath the forward point of juncture of said rails, depending wheel brackets vertically disposed toward the rear extremities of said rails, stub axles mounted at a right angle to the lower extremities of said brackets, wheels rotatably mounted on said axles outwardly of said wheel brackets, a toggle pivotally affixed at its lower extremities over the rear extremity of said tongue and extending upwardly therefrom, a movable inner frame centrally disposed within said main frame comprising a central beam member upwardly curved at its forward extremity, a rectangularly disposed axle housing mounted at the rear extremity of said central beam extending the width of the rear portion of said main frame beneath said wheel brackets, an axle rotatably mounted within said axle housing, angularly disposed support arms mounted at their apices on the extremities of said axle movable therewith and extending upwardly therefrom closely fitting under said wheel brackets, U-shaped brackets depending from the rear extremities of said main rails rearwardly of said wheel brackets, pivotal connections between said U-shaped brackets and the upper extremities of the rearmost of said support arms, pivoted latch means on said main rails engaging the upper extremities of the forward of said support arms when they are flush against the under surface of said main rails, nut means pivotally mounted between said depending arms at the forward extremity of said main frame, a screw threaded jack working through said nut engaging the threads thereof, a crank on the forward extremity of said jack, a rearwardly open U-shaped collar pivotally affixed at its forward extremity over the rear extremity of said jack member and pivotally engaging the upper extremities of said toggle at its rear extremities, a pivotal connection between the upper extremities of said toggle and the forward curved portion of said central beam of said inner frame, a removable auxiliary frame comprising forwardly converging parallel arms, a forwardly disposed riser member and a rear lateral beam removably affixed at its lower forward and rear extremities to said central beam of said inner frame whereby when the upper extremities of the forward of said support arms are not engaged by said latches appropriate rotation of said jack in said nut will result in swinging said toggle rearwardly or forwardly with respect to the rear extremity of said tongue to impart vertical movement to said inner frame and said auxiliary frame as the support arms of said inner frame pivot beneath the rear extremities of said main frame rails.

2. In a trailer a main frame comprising two rails parallel at their rear extremities converging and joined at their forward extremities, arms depending from the forward point of juncture of said rails, a longitudinal tongue horizontally supported between the lower extremities of said arms lying in a plane beneath and parallel to the plane of said rails and extending forwardly and rearwardly beneath the forward point of juncture of said rails, depending wheel brackets vertically disposed toward the rear extremities of said rails, stub axles mounted at a right angle to the lower extremities of said brackets, wheels rotatably mounted on said axles outwardly of said wheel brackets, a curved, double toggle pivotally affixed at its lower extremities over the rear extremity of said tongue and extending upwardly therefrom, a movable inner frame centrally disposed within said main frame comprising a central beam member upwardly curved at its forward extremity, a rectangularly disposed axle housing mounted at the rear extremity of said central beam extending the width of the rear portion of said main frame beneath said wheel brackets, an axle rotatably mounted within said axle housing, angularly disposed support arms mounted at their apices on the extremities of said axle movable therewith and extending upwardly therefrom closely fitting under said wheel brackets, U-shaped brackets depending from the rear extremities of said main rails rearwardly of said wheel brackets, pivotal connections between said U-shaped brackets and the upper extremities of the rearmost of said support arms, latch means on said main rails engaging the upper extremities of the forward of said support arms when they are flush against the under surface of said main rails, nut means pivotally mounted between said depending arms at the forward extremity of said main frame, a screw threaded jack working through said nut engaging the threads thereof, a crank on the forward extremity of said jack, a rearwardly open U-shaped collar pivotally affixed at its forward extremity over the rear extremity of said jack member and pivotally engaging the upper extremities of said toggle at its rear extremities, a pivotal connection between the upper extremities of said toggle and the forward curved portion of said central beam of said inner frame, a removable auxiliary frame comprising forwardly converging parallel arms, a forwardly disposed riser member and a rear lateral beam removably affixed at its lower forward and rear extremities to said central beam of said inner frame whereby when the upper extremities of the forward of said support arms are not engaged by said latches appropriate rotation of said jack in said nut will result in swinging said toggle rearwardly or forwardly with respect to the rear extremity of said tongue to impart vertical movement to said inner frame and said auxiliary frame as the support arms of said inner frame pivot beneath the rear extremities of said main frame rails.

3. In a trailer a main frame comprising two rails parallel at their rear extremities converging and joined at their forward extremities, arms depending from the forward point of juncture of said rails, a longitudinal tongue horizontally supported between the lower extremities of said arms lying in a plane beneath and parallel to the plane of said rails and extending forwardly and rearwardly beneath the forward point of juncture of said rails, depending wheel brackets vertically disposed toward the rear extremities of said rails, stub axles mounted at a right angle to the lower extremities of said brackets, wheels rotatably mounted on said axles outwardly of said wheel brackets, a toggle pivotally affixed at its lower extremities over the rear extremity of said tongue and extending upwardly therefrom, a movable inner frame centrally disposed within said main frame comprising a central beam member upwardly curved at its forward extremity, a rectangularly disposed axle housing mounted at the rear extremity of said central beam extending the width of the rear portion of said main frame beneath said wheel brackets, an axle rotatably mounted within said axle housing, angularly disposed support arms mounted at their apices on the extremities of said axle movable therewith and extending upwardly therefrom closely fitting under said wheel brackets, U-shaped brackets depending from the rear extremities of said main rails rearwardly of said wheel brackets, pivotal connections between said U-shaped brackets and the upper extremities of the rearmost of said support arms, pivoted latch means on said main rails engaging the upper extremities of the forward of said support arms when they are flush against the under surface of said main rails, nut means pivotally mounted between said depending arms at the forward extremity of said main frame, a screw threaded jack working through said nut engaging the threads thereof, a crank on the forward extremity of said jack, a rearwardly open U-shaped collar pivotally affixed at its forward extremity over the rear extremity of said jack member and pivotally engaging the upper extremities of said toggle at its rear extremities, a pivotal connection between the upper extremities of said toggle and the forward curved portion of said central beam of said inner frame, a removable auxiliary frame comprising forwardly converging parallel arms, a forwardly disposed riser member and a rear lateral beam removably affixed at its lower forward and rear extremities to said central beam of said inner frame, air springs disposed on said axle housing and supporting said rear beam of said auxiliary frame whereby when the upper extremities of the forward of said support arms are not engaged by said latches appropriate rotation of said jack in said nut will result in swinging said toggle rearwardly or forwardly with respect to the rear extremity of said tongue to impart vertical movement to said inner frame and said auxiliary frame as the support arms of said inner frame pivot beneath the rear extremities of said main frame rails.

4. In a trailer a main frame comprising two rails parallel at their rear extremities converging and joined at their forward extremities, parallel arms depending from the forward point of juncture of said rails, a tongue horizontally supported between the lower extremities of said arms lying in a plane beneath and parallel to the plane of said rails and extending forwardly and rearwardly beneath the forward point of juncture of said rails, depending wheel brackets vertically disposed toward the rear extremities of said rails, stub axles mounted at a right angle to the lower extremities of said brackets, wheels rotatably mounted on said axles outwardly of said wheel brackets, a toggle pivotally affixed at its lower extremities over the rear extremity of said tongue and extending upwardly therefrom, a movable inner frame centrally disposed within said main frame comprising a central beam member upwardly curved at its forward extremity, a rectangularly disposed axle housing mounted at the rear extremity of said central beam extending the width of the rear portion of said main frame beneath said wheel brackets, an axle rotatably mounted within said axle housing, angularly disposed support arms mounted at their apices on the extremities of said axle movable therewith and extending upwardly therefrom closely fitting under said wheel brackets, U-shaped brackets depending from the rear extremities of said main rails rearwardly of said wheel brackets, pivotal connections between said U-shaped brackets and the upper extremities of the rearmost of said support arms, latch means on said main rails engaging the upper extremities of the forward of said support arms when they are flush against the under surface of said main rails, nut means pivotally mounted between said depending arms at the forward extremity of said main frame, a screw threaded jack working through said nut engaging the threads thereof, crank means on the forward extremity of said jack, a rearwardly open U-shaped collar pivotally affixed at its forward extremity over the rear extremity of said jack member and pivotally engaging the upper extremities of said toggle at its rear extremities, a pivotal connection between the upper extremities of said toggle and the forward curved portion of said central beam of said inner frame, a removable auxiliary frame comprising forwardly converging parallel arms, a forwardly disposed riser member and a rear lateral beam removable affixed at its lower forward and rear extremities to said central beam of said inner frame whereby when the upper extremities of the forward of said support arms are not engaged by said latches appropriate rotation of said jack in said nut will result in swinging said toggle rearwardly or forwardly with respect to the rear extremity of said tongue to impart vertical movement to said inner frame and said auxiliary frame as the support arms of said inner frame pivot beneath the rear extremities of said main frame rails.

5. In a trailer a main frame comprising two rails parallel at their rear extremities converging and joined at their forward extremities, depending arms extending downwardly from the forward point of juncture of said rails, a tongue horizontally supported in the lower extremities of said depending arms lying in a plane beneath and parallel to the plane of said rails and extending forwardly an appreciable distance therefrom and rearwardly beneath said rails, depending wheel brackets vertically disposed beneath the rear extremities of said rails, stub axles supported at a right angle to the lower extremities of said wheel brackets, wheels rotatably mounted on said stub axles and disposed in vertical planes outward of and parallel to the planes of said brackets, a curved toggle member pivotally affixed at its lower extremities to the rear extremity of said tongue and extending upwardly therefrom, a movable inner frame centrally disposed of said main frame comprising a central beam member upwardly curved at its forward extremity and provided with a rectangularly disposed axle housing at its rear extremity extending the width of the rear portion of said main frame under said wheel brackets, an axle rotatable within said axle housing, angular support arms mounted at their apices to the extremities of said axle movable therewith and extending upwardly therefrom closely fitting under said wheel brackets, pivotal connections between the rear extremities of said main frame rails and the upper extremities of the rearmost of said support arms, flattened toe means disposed at the upper extremities of the two forward of said support arms normally lying flush against the under surface of said main frame rails, pivoted latch means on said main frame rails receiving said toe means of said forward support arms when in flush condition against said rails, nut means pivotally affixed between said depending arms at the forward extremity of said main frame, a screw threaded jack member passing through said nut and engaging the threads thereof, crank means on the forward extremity of said jack, a rearwardly open, U-shaped collar pivotally affixed at its forward apex to the rear extremity of said jack member and pivotally engaging the upper extremities of said toggle at its rear extremities, a pivotal connection between the upper extremities of said toggle and the forward, curved portion of said central beam of said inner frame, a removable auxiliary frame comprising forwardly converging parallel arms, a forwardly disposed riser member and a rear lateral beam removably affixed at its lower forward and rear extremities to said central beam of said inner frame whereby when the upper extremities of the forward of said support arms are not engaged by said latches appropriate rotation of said jack in said nut will result in swinging said toggle rearwardly or forwardly with respect to the rear extremity of said tongue to impart vertical movement to said inner frame and said auxiliary frame as the support arms of said inner frame pivot beneath the rear extremities of said main frame rails.

References Cited in the file of this patent

UNITED STATES PATENTS

| | | |
|---|---|---|
| 900,237 | Trent | Oct. 6, 1908 |
| 2,412,158 | Kuehlman et al. | Dec. 3, 1946 |
| 2,693,288 | Black | Nov. 2, 1954 |